2 Sheets--Sheet 1.
M. B. ERSKINE.
Improvement in Mounted Horse-Powers.
No. 4,423. Reissued June 13, 1871.
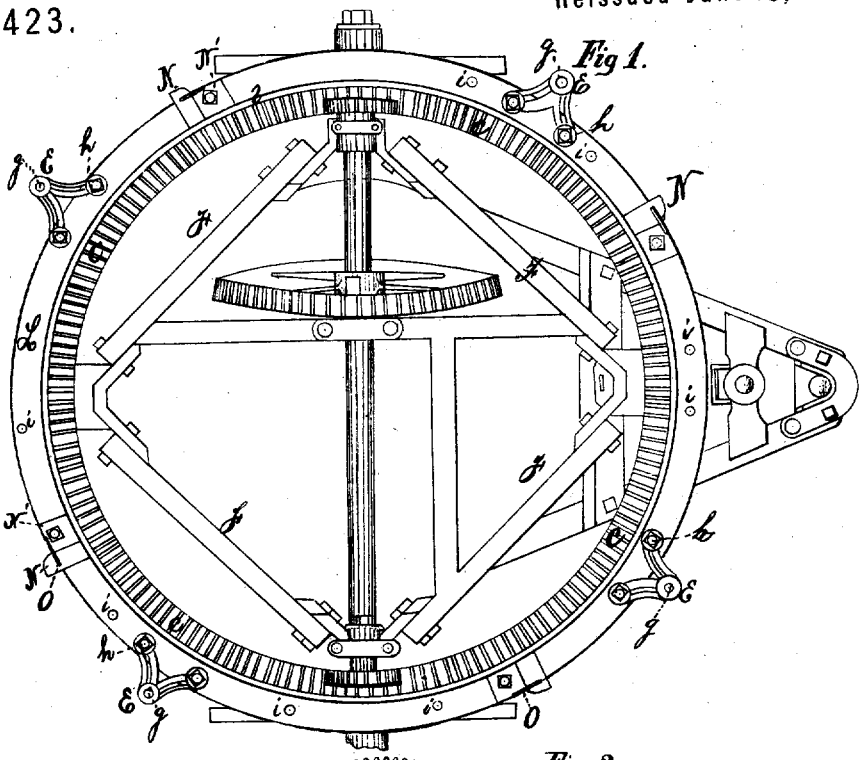
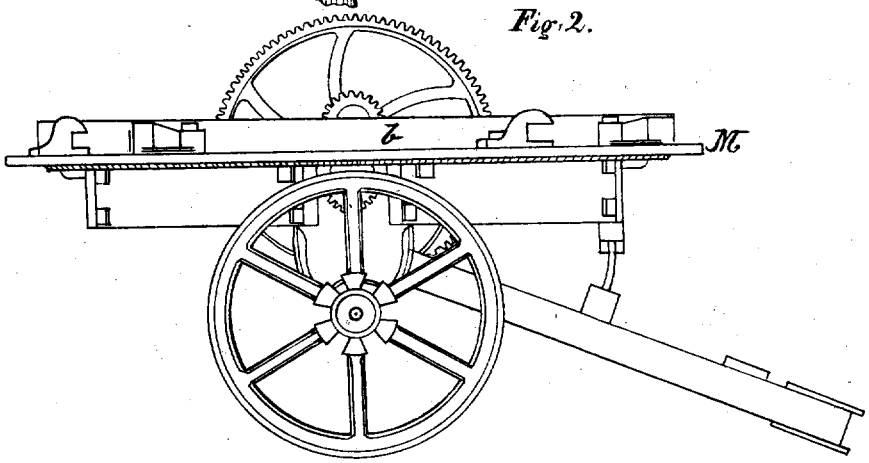
Witnesses:
Parker W. Sweet, Jr.
W. J. Fenton
Inventor:
Massena B. Erskine.
by his Attorney
James L. Norris
AM. PHOTO-LITHOGRAPHIC CO. N.Y. (OSBORNE'S PROCESS.)

2 Sheets--Sheet 2.

M. B. ERSKINE.

Improvement in Mounted Horse-Powers.

No. 4,423. Reissued June 13, 1871.

Witnesses:
Parker H. Sweet, Jr.
W. J. Leyton.

Inventor:
Massena B. Erskine
by his Attorney
James L. Norris.

AM. PHOTO-LITHOGRAPHIC CO. N.Y. (OSBORNE'S PROCESS.)

UNITED STATES PATENT OFFICE.

MASSENA B. ERSKINE, OF RACINE, WISCONSIN.

IMPROVEMENT IN MOUNTED HORSE-POWERS.

Specification forming part of Letters Patent No. 107,237, dated September 13, 1870; reissue No. 4,423, dated June 13, 1871.

*To all whom it may concern:*

Be it known that I, MASSENA B. ERSKINE, of Racine, in the county of Racine and State of Wisconsin, have invented a new and useful Improvement in Mounted Horse-Powers; and I do hereby declare that the following is a clear and exact description of the nature thereof sufficient to enable others skilled in the art to make and use the same, reference being had to the accompanying drawing making part of this specification, in which—

Figure 3:
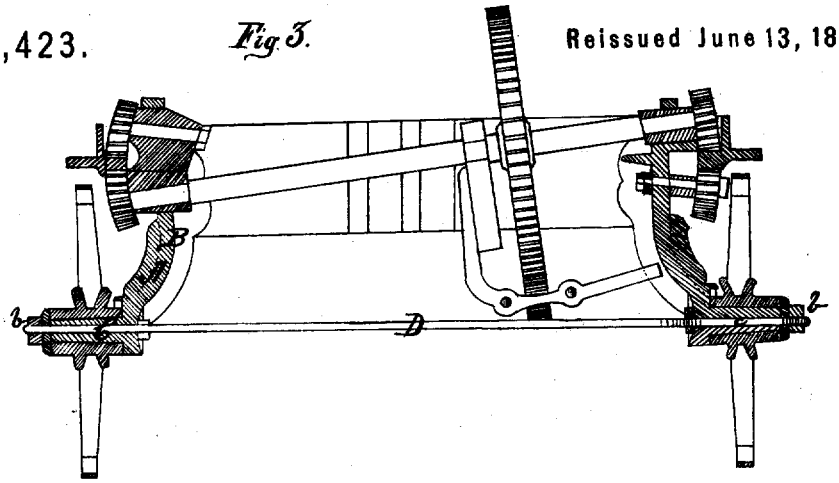
Figure 6:
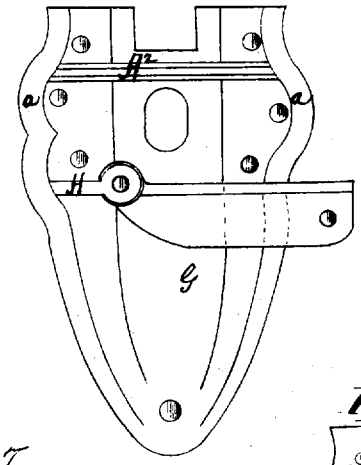
Figure 5:
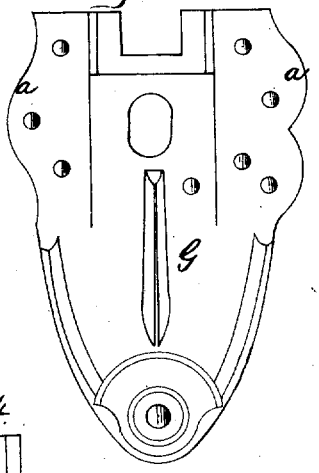
Figure 7:
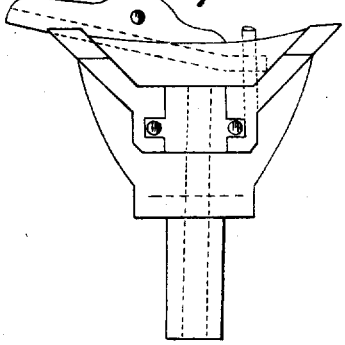
Figure 4:
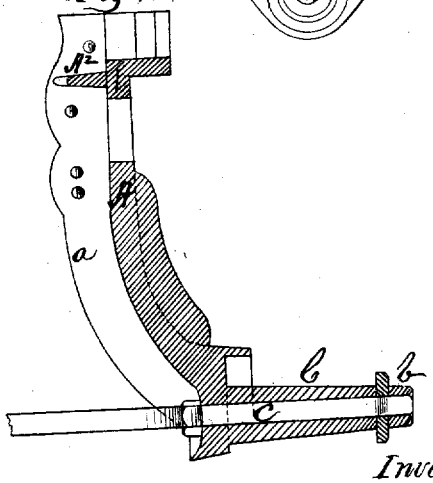

Figure 1 is a top or plan view of a mounted horse-power with my improvements attached thereto; also illustrating the construction of the master-wheel. Fig. 2 is a vertical cross-section of the same, showing the connecting or truss rod, taken on the line *x x* of Fig. 1. Fig. 3 is a side view, showing the position of the machine when in use. Fig. 4 is a vertical section of my improved axle detached from the frame-work of the horse-power. Fig. 5 is an outside view of the upright part. Fig. 6 is an inside view; while Fig. 7 is a lower or horizontal view of the said improved axle.

This invention is designed as an improvement upon what is termed the "Woodbury or mounted horse-power;" and to this end it consists essentially in giving such a form or shape to the axles as to permit or cause the wheels upon which the machine proper rests or is transported to be in a perpendicular line, whereby the wheels are, to a great extent, prevented from breaking at the point where the spokes enter the hub, due to the strain constantly upon them when the machine is at rest or is being transported. It also consists in providing the inside or concave portion of the axle, near its upper part, with an iron support or bar, whereby all splitting or twisting of that portion of the axle is prevented. It also consists in providing the interior or concave of the axle with an iron eyebolt so as to strengthen the bolts or pins which connect the inside raming together. It also consists in enlarging and shaping that portion of the axle outside of the bolt-holes so as to reliably permit the use of three bolts, out of line with each other, upon each side of the axle, by which means great strength to the axle and substantial connection between it and the machine are secured. It further consists in the method of connecting the two axles together by means of a truss-rod, whereby the strain upon the axles is equalized and the wheels held together in the desired position. And, finally, it consists in forming the outside rim of the master-wheel with a series of openings to receive brackets and sockets for the draft-bars, each being of equal distance apart, so that two or more of said draft-bars may be readily attached or detached when it is desired to employ from two to twelve horses, more or less.

In the accompanying drawing like letters of reference indicate corresponding parts in each figure on the several sheets.

As this invention is designed chiefly as an improvement upon the axles, strengthening of the machine, and the construction of the master-wheel of what is known as the Woodbury or mounted horse-power, it is only necessary to describe such improvements, as the gearing used and the operation of the machine are old and well known.

A represents the axle, formed or cast of suitable metal, having the upright standard B and axle-arm C so constructed that the wheels upon which the machine is built will stand in a perpendicular position, as clearly shown in Fig. 3, whereby the wheels are not liable to break, as is frequent with the axles now used in such class of machines. The interior or concave portion of the axle is formed or provided with an iron bar or support, $A^2$, as shown in Fig. 6, by which means the axle is strengthened and all twisting or splitting effectually prevented—an objection to which they heretofore were subjected. H is a wrought-iron eyebolt, arranged upon the inside or concave of the axle, as in Fig. 6, by means of which the pins which connect the framing or V-pieces to the axles are greatly strengthened. In order to furnish great strength to the axle and to the machine I enlarge and peculiarly shape that portion of the standard B of the axle A, outside of the bolt-holes *a a a*, so as to permit the employment of three bolts instead of two, one on each side of the axle, said bolt-openings being out of a straight line with each other. D is a truss-rod connecting the two arms of the axle A together. The ends of the truss-rod D have screw-threads cut upon their periphery, upon which screw the nuts *b b*, so that when the said ends of the rod pass through the openings *c* of the axle-arm C the wheels will be retained in place by placing upon and screwing up the nuts *b* upon the screw-thread, as clearly shown in Fig. 2. By the employment of the truss-rod the strain upon the axle is equalized, and, at the same time, the connection of the corner pieces F are strengthened and are not liable to break, as is the case with machines now in use. The outside or convex portion of the axle is further increased in strength and durability by increasing that portion of the axle marked G in Figs. 5 and 6, by the convexity of the outside on the horizontal line, and the concavity of the same on the perpendicular line. It will be seen that, by the form and peculiar construction given to the axle for connecting the various parts of the frame-work, not only the axles are rendered more durable, but that the machine itself is more efficient and useful.

Having described my several improvements relating to their axles and their connections, I will now refer to the construction of the master-wheel. It is so constructed that six, eight, ten, or more horses may be readily attached, by means of a series of adjustable brackets and sockets, which brackets and sockets are so formed that the openings in the same correspond with the openings formed in the rim of the master-wheel, and are secured thereto by means of bolts or other suitable attachment. The letter L represents my improved master-wheel, cast or formed in one piece, with the flanged rim or surface M, upright rim *b*, and a series of gear-teeth, *c c*. The flanged rim or surface is provided with a series of holes or openings, *i i i i*, the relative distance between each being substantially the same, for the purpose of attaching a series of brackets, E E. These brackets are constructed in a single piece, and are formed with an eye, *g*, and openings *h h*. The eye *g* engages with a suitable hook upon the draft-bar, while the openings *h h*, being of an equal distance apart, correspond with the openings *i i* of the rim of the master-wheel, and are readily secured thereto by means of bolts, &c. The sockets N N are also adjustable, and are formed with extensions, N′, and openings, by which means they are readily attached or detached from one point to another on the rim of the master-wheel, the openings *h h* being formed so that the distance from the openings *i i* are of equal distance apart. The rings O upon the sockets N move freely around, so that, when a draft-bar is inserted through it into the socket and secured to the bracket, as above described, it tends to strengthen and lessen the strain upon the brackets. By this construction a master-wheel is produced so that any required number of horses may be attached—a feature much to be desired when heavy draft is essential.

Having thus described my invention, what I claim as new, and desire to secure by Letters Patent, is—

1. The axle A, formed with the standard B and hollow axle-arm C, substantially as and for the purpose set forth.

2. The standard B of the axle A, provided with the strengthening-bar $A^2$, substantially as and for the purpose set forth.

3. The enlargement or swell of the flange of the axle, said flange being perforated with three openings or holes out of direct line with each other, substantially as and for the purpose set forth.

4. The wrought-iron eyebolt H, when used in the connection and for the purpose substantially as herein shown and specified.

5. The truss-rod D, connecting the two axles, substantially as and for the purpose described.

6. The hollow axle-arm C of the axle A, in combination with the truss-rod D, for the purpose specified.

7. The two nuts *b b*, or equivalent fastenings, arranged upon the truss-rod at each end of the hollow axle-arm C of the axle, substantially as herein shown.

8. The master-wheel L, formed with a series of openings, *i*, and arranged to operate in connection with the adjustable brackets E and sockets N, substantially as herein shown and set forth.

To the above specification I have signed my name this 23d day of May, 1871.

MASSENA B. ERSKINE.

Witnesses:

JNO. G. MCMYNN,

E. R. GRIFFITH.